March 29, 1949.　　　C. J. FRETTOLOSO　　　2,465,366
CHUCK

Filed May 23, 1945　　　　　　　　　　2 Sheets-Sheet 1

INVENTOR.
Carmine J. Frettoloso
BY
Ralph L. Chappell
ATTORNEY

March 29, 1949.  C. J. FRETTOLOSO  2,465,366
CHUCK

Filed May 23, 1945.  2 Sheets-Sheet 2

INVENTOR.
Carmine J. Frettoloso
BY
Ralph L. Chappell
ATTORNEY

Patented Mar. 29, 1949

2,465,366

UNITED STATES PATENT OFFICE 2,465,366

CHUCK

Carmine J. Frettoloso, New York, N. Y.

Application May 23, 1945, Serial No. 595,379

5 Claims. (Cl. 279—2)

(Granted under the act of March 3, 1883, as amended April 30, 1928; 370 O. G. 757)

This invention relates to improvements in chucks for holding piston rings during the milling operation necessary for the making of oil-drain slots.

The primary object of this invention is to provide a chuck that is adjustable readily to fit any size piston ring.

Another object is to provide a chuck that is adjustable to fit any size piston ring and hold the ring in position rigidly for slotting.

Further objects and advantages of this invention, as well as its construction, arrangement and operation, will be apparent from the following description and claims in connection with the accompanying drawings, in which Fig. 1 is a side view of an assembled chuck, omitting the clamping disc and with a portion in vertical section, the extreme outward position of the clamping sectors being shown by phantom lines;

Similar numerals refer to similar parts throughout the several views. Clamping sectors 10, movable toward and away from their common center, are mounted on base plate 11. Each clamping sector 10 has a series of arcuate ridges 12, which form broken concentric circles.

Figure 1:
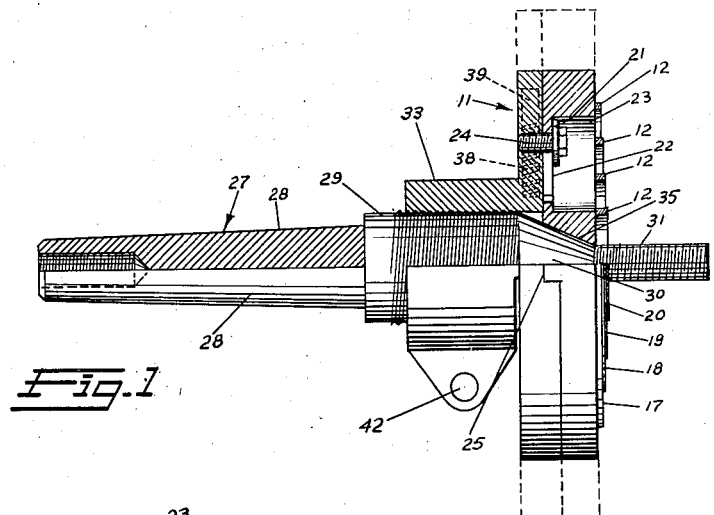
Figure 4:
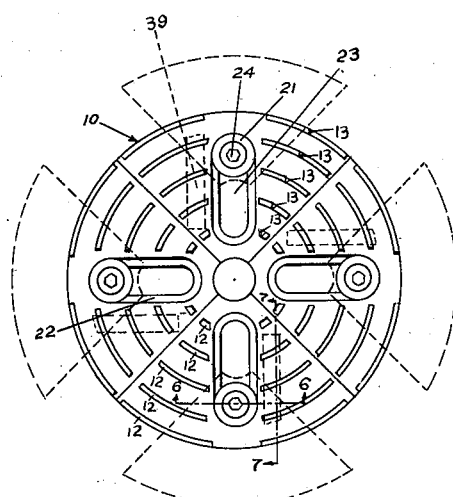
Fig. 4 is a plan view of the assembly as viewed from the right in Fig. 1, the extreme outward position of the clamping segments being shown by phantom lines.
Figure 2:
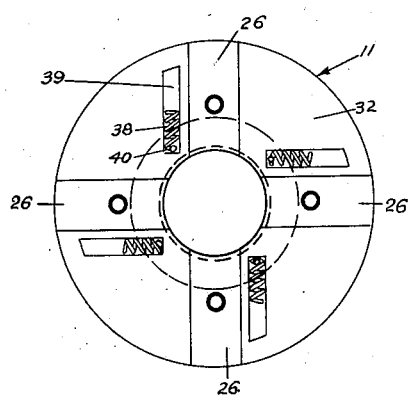
Fig. 2 is a plan view of the base plate, as viewed from the right in Fig. 1.
Figure 8:
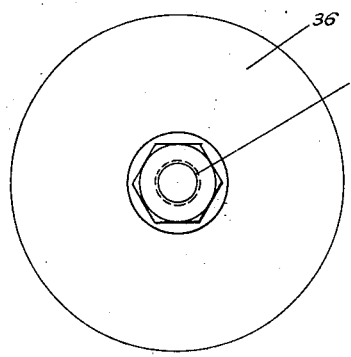
Fig. 8 is a plan view of the clamping disc.
Figure 9:
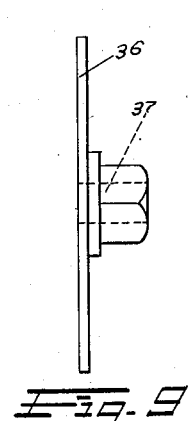
Fig. 9 is a side view in elevation of the clamping disc.
Figure 3:
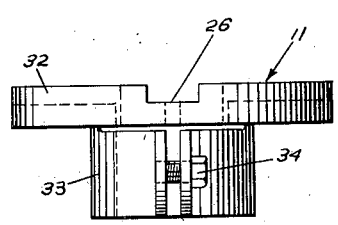
Fig. 3 is an elevational view of the base plate.
Figure 6:
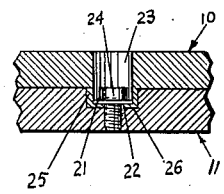
Fig. 6 is a fragmentary view of a clamping sector, taken in vertical section along the line 6—6 of Fig. 4.
Figure 7:
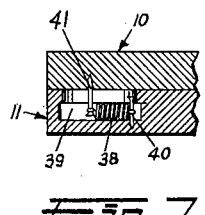
Fig. 7 is a fragmentary view taken along line 7—7 of Fig. 4, showing the function of one of the springs.
Figure 5:
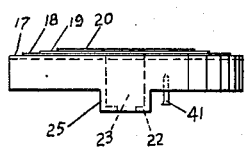
Fig. 5 is an elevational view of a clamping sector.
Figure 10:
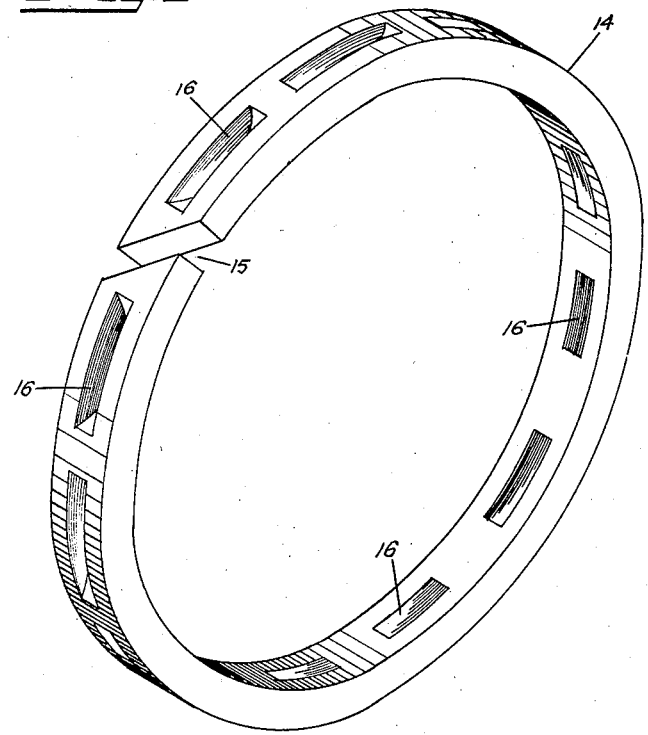
Fig. 10 is an isometric view of the finished piston ring.

Ridges 12 protrude only a short distance from the clamping sectors 10 to allow the use of a milling cutter axially outwardly of the ridges 12 as viewed in Fig. 1 as well as between the ridges 12. Index marks 13 are provided on the ridges 12 on one radius for proper positioning of the piston ring 14. This is accomplished when gap 15 of piston ring 14 is closed at the index mark 13, it being understood that the indexing device on the milling machine for spacing the slots 16 accurately and evenly is set up for its function from the index mark 13.

Each area between ridges is stepped as shown at 17, 18, 19 and 20 to provide clearance for the milling cutter.

The clamping sectors 10 are attached to the base plate 11 by means of washers 21, which are forced against ledges 22 on the elongated slots 23 by means of screws 24 received in the base plate 11. It is to be noted that slots 23 are cut through the tongues 25 of the clamping sectors 10.

Sliding engagement between the clamping sectors 10 and base plate 11 is achieved by means of tongues 25 integral with clamping sectors 10, which tongues are received in grooves 26 in base plate 11.

The chuck in its entirety is mounted on mandrel 27, which has a shank 28, a threaded cylindrical section 29, a conical section 30, and a threaded stud 31.

Base plate 11 comprises an apertured disc 32 mounted on a threaded integral collar 33, which is bored at 42 for the reception of locking bolt 34.

Expansion of the clamping sectors 10 is achieved by rotating the collar 33 on the mandrel 27 and causing the cone 30 to force the clamping sectors 10 to the desired expanded position. It will be noted that each clamping sector 10 is beveled at 35 for this purpose. After proper positioning of the clamping sector 10, screws 24 and bolt 34 are tightened to secure the clamping sectors 10 and the device as a whole on the mandrel 27.

Added support for the piston ring 14 is afforded by screwing face plate 36 on stud 31 by means of nut 37 integral with the face plate 36.

Upon completion of the slotting operation, the clamping sectors 10 are retracted readily by means of tension springs 38 in wells 39 of the base plate 11. The springs 38 are attached at one end to pins 40 fixed in the wells 39 and at their other ends are attached to the pins 41, which are fixed to the inner faces of the clamping sectors 10.

In the operation of the device, the assembled chuck is rotated, causing the clamping sectors 10 to move outwardly. The piston ring 14 is then placed within the desired series of ridges 12 and the chuck rotated in the reverse direction until the piston ring 14 fits snugly within the selected ridges 12, and the opening 15 is closed at index mark 13. Screws 24 are tightened to hold the clamping sectors 10 in place and clamping disc 36 is threaded on stud 31 to hold the piston ring 14 securely in place. The milling cutter is then inserted between the clamping sectors 10 and clamping disc 36 to cut the slots 16 in piston ring 14.

While a chuck with four clamping sectors is illustrated, it is to be understood that a chuck with any number of such sectors can be employed.

Various modifications and changes can be made in the subject device without departing from the scope of the invention.

The invention described herein may be manufactured and used by or for the Government of the United States of America for governmental purposes without the payment of any royalties thereon or therefor.

I claim:

1. A chuck assembly comprising a mandrel, said mandrel having a threaded portion, a conical portion adjacent to said threaded portion, and a stud adjacent to said conical portion, a split collar in threaded engagement with said threaded portion, a generally disc shaped plate on said collar, wells in said plate, tension springs in said wells and attached thereto, radial grooves in said plate, sector-shaped plates, each of said sector-shaped plates having a tongue located in each of said grooves, the smaller ends of said sector-shaped plates being in contact with said conical portion, the faces of said sector-shaped plates having arcuate ridges for holding the work, radial slots in said sector-shaped plates extending through said tongues, a ledge about the bottom of each of said slots, a washer on each of said ledges, a screw passing through each of said washers and into each of the grooves of said plate, the portions of said sector-shaped plates between said ridges being stepped, means to attach each of said springs to each of said sector-shaped plates, a clamping plate in threaded engagement with said stud, and a clamping bolt on said split collar.

2. A chuck comprising a base, radial channels in said base at right angles to each other, wells in said base parallel to said channels, tapped holes in said channels, four sector-shaped clamping devices, said clamping devices having tongues fitting in said channels, slots in said tongues and clamping devices, and fasteners in engagement with said clamping devices and passing through said tongue slots and tapped holes, springs in said wells connected to said base and said clamping devices and means to move said clamping devices radially.

3. A chuck assembly comprising a mandrel having a threaded portion, a conical portion and a stud adjacent to said conical portion, a collar mounted on said threaded portion, means to secure said collar in selected position thereon, a base plate provided with a plurality of radial grooves and carried by said collar, a plurality of sector-shaped plates each having a tongue engaged slidably in one of said grooves, the converged ends of said sector-shaped plates abutting said conical portions and the faces thereof being stepped and having arcuate ridges on selected steps, radial slots in said sector-shaped plates extending through said tongues, means to secure said sector-shaped plates to said base plate, resilient means to retract said sector-shaped plates, and a clamping plate in threaded engagement with said stud.

4. A chuck comprising a base, a plurality of radial channels in said base, wells in said base parallel to said channels, tapped holes in said channels, a plurality of sector-shaped clamping devices, said clamping devices having tongues fitting in said channels, slots in said tongues and said clamping devices, fasteners in engagement with said clamping devices and passing through said tongue slots and tapped holes, springs in said wells connected to said base and to said clamping devices, and means to move said clamping devices radially.

5. A chuck comprising a base, radial channels in said base at right angles to each other, wells in said base parallel to said channels, tapped holes in said channels, a plurality of sector-shaped clamping devices, said clamping devices having tongues fitting in said channels, slots in said tongues and clamping devices, and fasteners in engagement with said clamping devices and passing through said tongue slots and tapped holes, springs in said wells connected to said base and means to move said clamping devices radially.

CARMINE J. FRETTOLOSO.

REFERENCES CITED

The following references are of record in the file of this patent:

UNITED STATES PATENTS

| Number | Name | Date |
|---|---|---|
| 357,437 | Westcott | Feb. 8, 1887 |
| 803,812 | Davidson | Nov. 7, 1905 |
| 1,161,490 | McKinney | Nov. 23, 1915 |
| 1,359,992 | Hook | Nov. 23, 1920 |
| 1,527,866 | Hall | Feb. 24, 1925 |

FOREIGN PATENTS

| Number | Country | Date |
|---|---|---|
| 3,414 | Great Britain | May 20, 1908 |